(12) United States Patent
Tsai

(10) Patent No.: US 6,466,434 B1
(45) Date of Patent: Oct. 15, 2002

(54) DISK ASSEMBLY INCORPORATING THEREIN USB CONNECTOR AND COMPUTER CASE HAVING THEREIN SAME

(75) Inventor: Hsi Tung Tsai, Hsinchu (TW)

(73) Assignee: Windbond Electronics Corp., Hsinchu (TW)

( * ) Notice: Subject to any disclaimer, the term of this patent is extended or adjusted under 35 U.S.C. 154(b) by 0 days.

(21) Appl. No.: 09/543,717

(22) Filed: Apr. 5, 2000

(51) Int. Cl.[7] .................................................. G06F 1/16
(52) U.S. Cl. ..................... 361/685; 361/683; 360/97.01; 369/75.1; 369/77.2; 710/100
(58) Field of Search .................................. 301/685, 686, 301/684, 683; 360/97.01, 137, 137 D; 369/75.1, 77.1, 77.2; 710/1, 100

(56) References Cited

U.S. PATENT DOCUMENTS

| | | | | |
|---|---|---|---|---|
| 4,501,460 A | * | 2/1985 | Sisler | 361/686 |
| 4,680,674 A | * | 7/1987 | Moore | 361/686 |
| 5,253,133 A | * | 10/1993 | Guo | 360/97.01 |
| 5,646,610 A | * | 7/1997 | Trainor et al. | 340/825.79 |
| 6,064,566 A | * | 5/2000 | Agata et al. | 361/684 |
| 6,073,188 A | * | 6/2000 | Fleming | 710/38 |
| 6,078,966 A | * | 6/2000 | Kobayashi et al. | 710/1 |
| 6,098,174 A | * | 8/2000 | Baron et al. | 713/300 |
| 6,128,743 A | * | 10/2000 | Rotherbaum | 713/300 |
| 6,141,221 A | * | 10/2000 | Tong et al. | 361/724 |
| 6,151,645 A | * | 11/2000 | Young et al. | 710/63 |
| 6,219,232 B1 | * | 4/2001 | Bang et al. | 361/685 |
| 6,289,466 B1 | * | 9/2001 | Bayramoglu et al. | 713/310 |

FOREIGN PATENT DOCUMENTS

JP  2000-163168 A  *  6/2000  ............. G06F/1/16

* cited by examiner

Primary Examiner—Darren Schuberg
Assistant Examiner—Lisa Lea-Edmonds
(74) Attorney, Agent, or Firm—Gardere Wynn Sewell LLP; Sanford E. Warren, Jr.; Kenneth T. Emanuelson

(57) ABSTRACT

A disk assembly includes an assembly housing having a front end for inserting/retrieving therethrough a disk storing thereon computer-accessible data. The front panel is mounted at the front end and has a slot for passing therethrough the disk. USB connectors are mounted on the front panel for electrically connecting therethrough a peripheral device to a computer case. The computer case can conveniently mount therein such a disk assembly.

16 Claims, 3 Drawing Sheets

DISK ASSEMBLY INCORPORATING THEREIN USB CONNECTOR AND COMPUTER CASE HAVING THEREIN SAME

FIELD OF THE INVENTION

The present invention relates to a disk assembly or a computer case incorporating therein the disk assembly, and more particularly to a disk assembly incorporating therein a USB (Universal Serial Bus) connector or a USB hub.

BACKGROUND OF THE INVENTION

The Universal Serial Bus (USB) connector is getting more and more common for connection ports in personal computers because the connection between personal computer and external peripheral equipments can be simplified. As a result, a transmission cable can serially connect together kinds of peripheral equipments, by which not only the phenomenon that a messy bundle of tangled cables can be obviated, but kinds of peripheral equipments can be readily put into use without reset or the installing procedure. As such, compulsory peripheral devices, e.g. keyboard or mouse have been developed to support USB connection. Furthermore, newly developed peripheral equipments, e.g. digital camera, scanner or digital video recorder have already adopted the USB as standard interface, serving as the primary medium for being connected to the personal computer.

As schematically shown in FIG. 1, the electric disgram of a conventional USB hub includes a Series B receptacle 11 serving as an upstream port electrically connected to a USB port 16 of a mother board 15 of a personal computer 18 through a USB cable 17, a USB hub controller chip 12 electrically connected to Series B receptacle 11, and a plurality of Series A receptacles 13 serving as downstream ports electrically connected to USB hub controller chip 12 for respective connections with external peripheral equipments.

Presently, the USB hub might be designed at a specific place of the computer case itself. For DIY (do-it-yourself) or upgrade assembly, the following two alternatives are found:

1) The interface type: An interface panel, as shown in FIG. 2A, mounted on the back of the computer case has thereon Series A receptacles 21 exposing from the back of the computer case; and
2) 3.5-in disk drive type: A housing presenting the appearance of a 3.5-in disk drive to be mounted in a floppy disk drive slot of a computer case, as shown in FIG. 2B exposes Series A receptacles 22 at the front surface of the computer case.

Since in addition to the fact that it is hard to reach the back of the computer case, there already are lots of connections for peripheral signal cables at the case back, not only it is hard in usage for the user, but the room for other interface cards will be occupied to some extent also, if Series A receptacles are provided at the back of the computer case as shown in FIG. 2A. Alternatively, if Series A receptacles are provided at the front surface of a fake disk drive in the computer case as shown in FIG. 2B, not only the room for a disk drive is occupied, but also such USB hub can be operated only when it is energized by an external power source 14. It has been known that the power supply in a computer case has limited power-supplying wires so that if the USB hub is to be additionally power-supplied, it might cause troubles to the user if he wants to add a hard disk drive, a CD-ROM drive and/or a CD-Recorder.

It is therefore tried by the Applicant to deal with the above situations encountered in the prior art.

SUMMARY OF THE INVENTION

It is therefore an object of the present invention to provide a disk assembly capable of additionally providing a USB connector.

It is further an object of the present invention to provide a computer case capable of additionally providing a USB hub.

It is further an object of the present invention to provide a computer case capable of providing a USB hub in its front panel.

It is yet an object of the present invention to provide a USB hub without additionally occupying the room of a computer case.

It is still more an object of the present invention to provide a USB hub without the necessity of occupying the power-supplying wires of a power supply in a computer case.

It is further another object of the present invention to provide a USB hub easily accessible in a computer case.

According to an aspect of the present invention, a computer case mounts therein a disk assembly including an assembly housing having a front end for inserting/retrieving therethrough a disk storing thereon computer-accessible data, a front panel mounted at the front end and having a slot for passing therethrough the disk, and a USB connector mounted on the front panel for electrically connecting therethrough a peripheral device to the computer case.

Preferably the computer case includes a power supply for power-supplying the computer case, and the assembly housing includes therein a USB hub controller power-supplied by the power supply.

Preferably the assembly housing and the USB hub are electrically connected to the power supply through the same power cable. Preferably the assembly housing provides thereby a USB hub.

Preferably the present computer case further includes a mother board having a USB port, and the USB hub further includes an upstream connector, a USB cable electrically connecting together the upstream connector and the USB port, another USB connector, and a USB hub controller electrically connected between the upstream connector and the USB connectors.

Preferably the upstream connector is a Series B receptacle, and the above-mentioned USB connectors are Series A receptacles.

Certainly, the disk assembly can be a floppy disk drive or an optically accessible assembly. The optically accessible assembly can be a CD-ROM drive, a DVD-ROM drive, a CD-RW drive or a combination built with a DVD-ROM drive and a CD-RW drive.

According to another aspect of the present invention, a disk assembly includes an assembly housing having a front end for inserting/retrieving therethrough a disk storing thereon computer-accessible data, a front panel mounted at the front end and having a slot for passing therethrough the disk, and a USB connector mounted on the front panel and adapted to electrically connect therethrough a peripheral device to a computer case.

As mentioned in the above, the disk assembly can be a floppy disk drive or an optically accessible assembly or an optical storage device.

Preferably the assembly housing provides thereby a USB hub.

Preferably the computer case further includes a mother board having a USB port, and the USB hub further includes an upstream connector, a USB cable electrically connecting together the upstream connector and the USB port, another USB connector, and a USB hub controller electrically connected between the upstream connector and the USB connectors.

According to further an aspect of the present invention, a USB hub adapted to be used with a computer case having a mother board having a USB port includes an assembly housing for inserting therein/retrieving therefrom a disk storing thereon computer-accessible data, an upstream connector, a USB cable electrically connecting together the upstream connector and the USB port, a plurality of downstream connectors for respectively electrically connecting therethrough a plurality of peripheral devices to the computer case, and a USB hub controller electrically connected between the upstream connector and the USB connectors.

Preferably the assembly housing further includes a front end for inserting/retrieving therethrough the disk, and a front panel mounted at the front end and having a slot for passing therethrough the disk.

Certainly, the disk assembly can be a floppy disk drive or an optically accessible assembly wherein said disk assembly can be one selected from a group consisting of a CD-ROM drive, a DVD-ROM drive, a CD-RW drive and a combination built with DVD-ROM drive and CD-RW drive.

Preferably the computer case has a power supply and said assembly housing and said USB hub are electrically connected to said power supply through the same power cable.

The present invention may best be understood through the following descriptions with reference to the accompanying drawings, in which:

DETAILED DESCRIPTION OF THE PREFERRED EMBODIMENT

Figure 1:
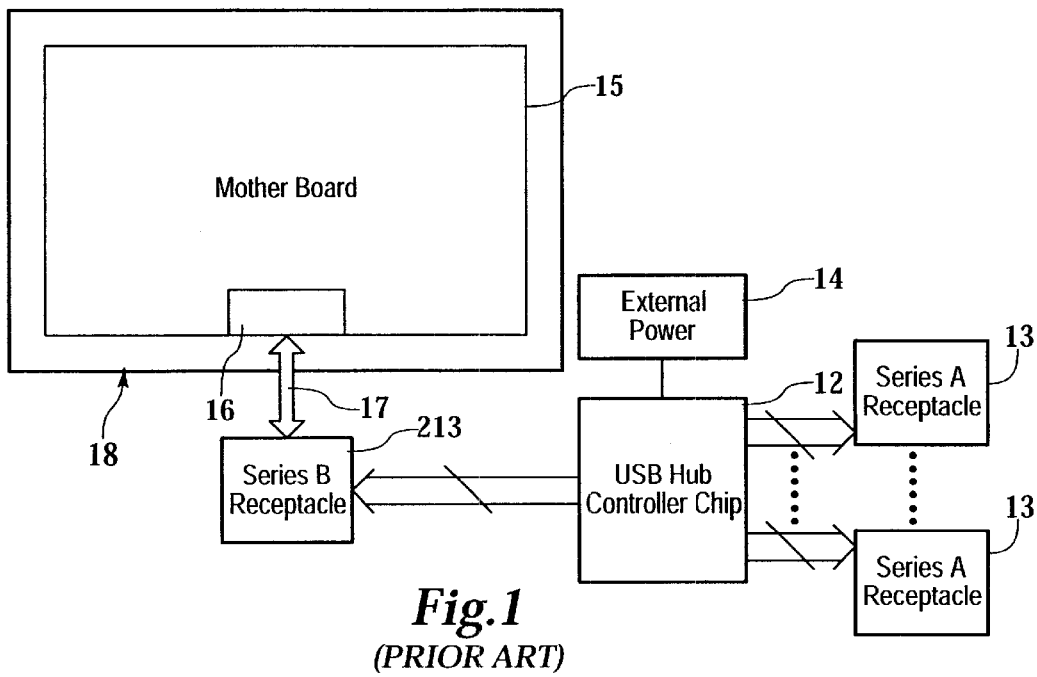
FIG. 1 is a schematical view showing a basic block diagram for a conventional USB hub.
Figure 2A:
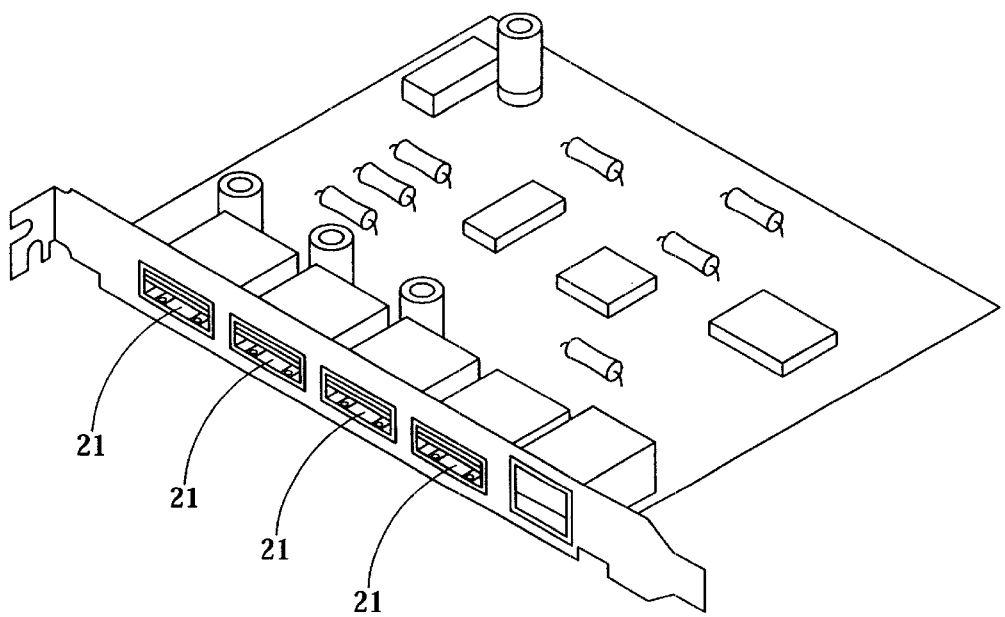
FIG. 2A is a schematical view showing a USB hub according to the prior art.
Figure 2B:
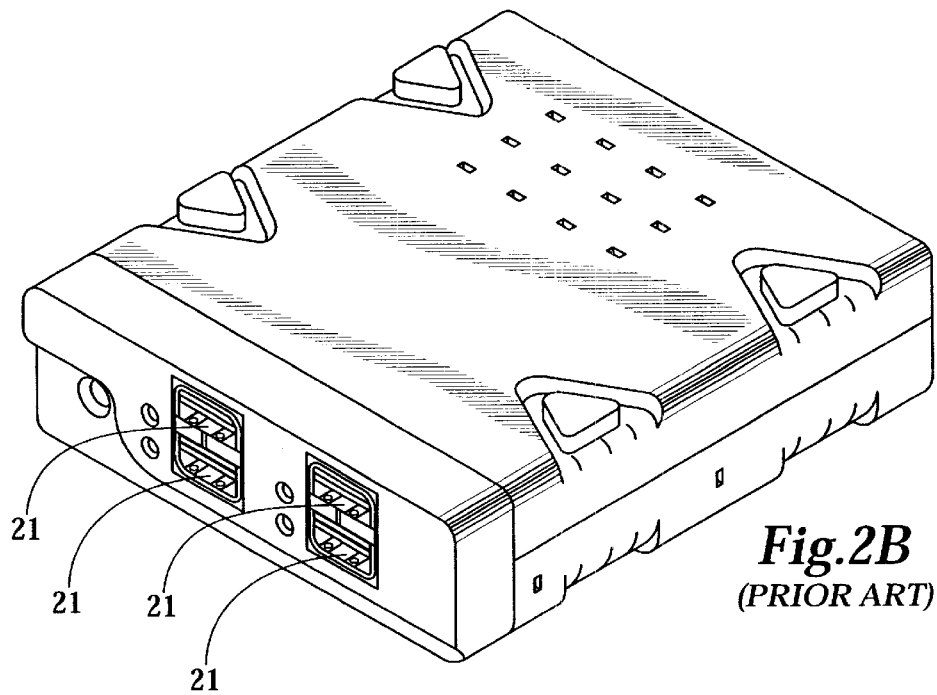
FIG. 2B is a schematical view showing further a USB hub according to the prior art.
Figure 3:
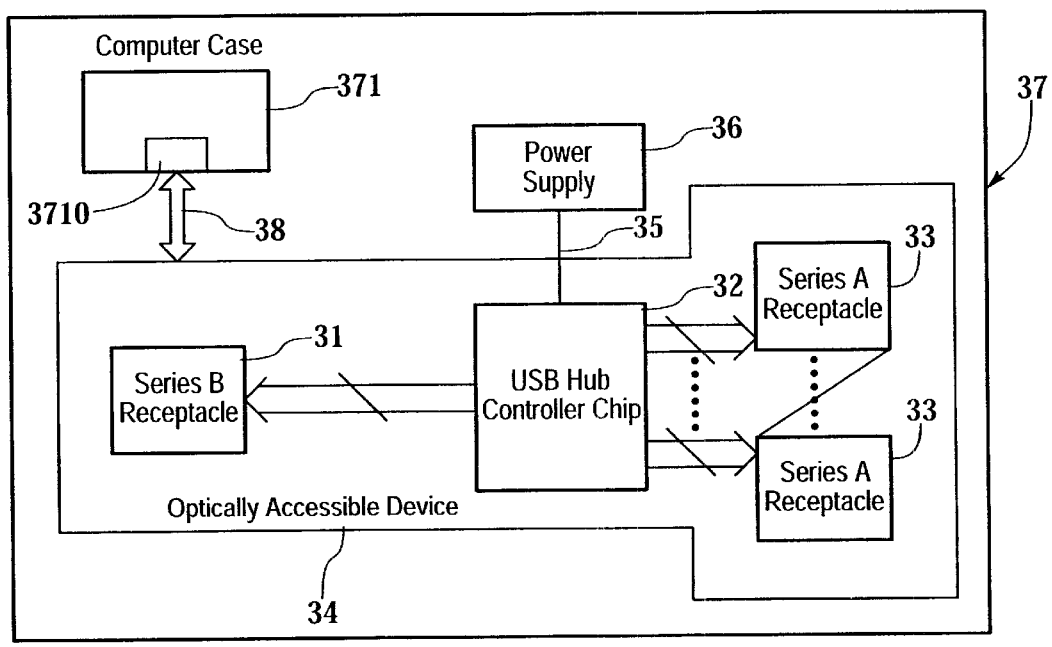
FIG. 3 is a simplified schematical view illustrating a preferred embodiment of a computer case according to the present invention.
Figure 4:
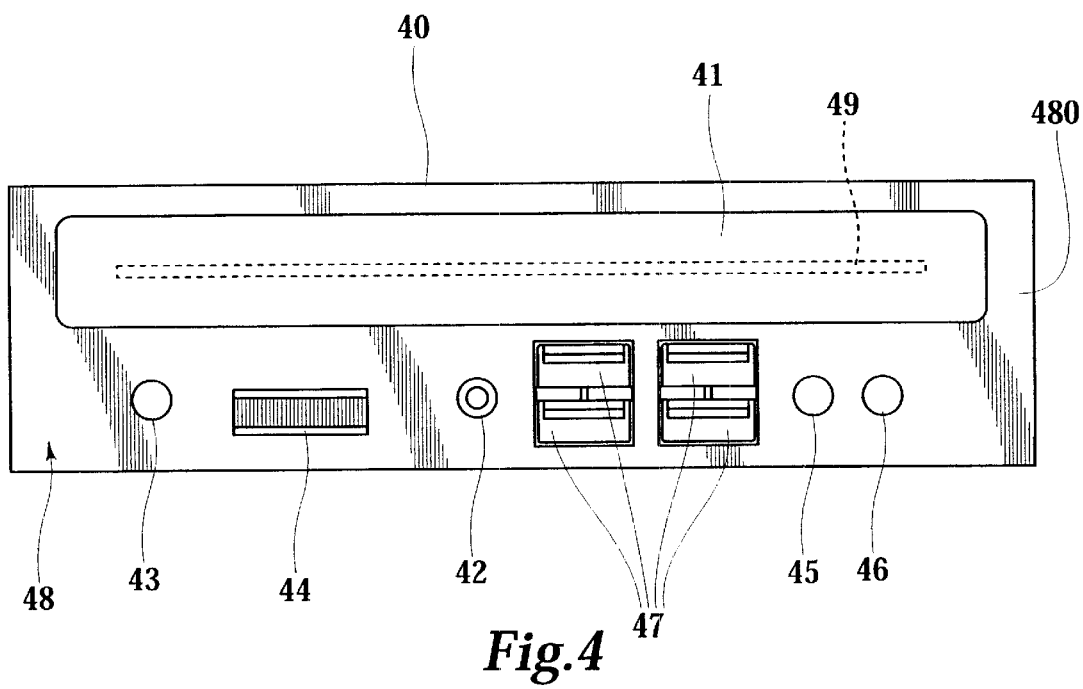
FIG. 4 is a schematical view showing a preferred embodiment of a disk assembly or a USB hub according to the present invention.

As shown in FIGS. 3 & 4, there is shown a simplified schematical view illustrating a preferred embodiment of a computer case 37 according to the present invention. Computer case 37 mounts therein a disk assembly 34 including an assembly housing 40 having a front end 48 for inserting/retrieving therethrough a disk 49 storing thereon computer-accessible data, a front panel 480 mounted at front end 48 and having a slot 41 for passing therethrough disk 49, and at least a USB connector 47 mounted on front panel 480 for electrically connecting therethrough a peripheral device to computer case 37.

Internally, computer case 37 includes a power supply 36 for power-supplying computer case 37, and assembly housing 40 includes therein a USB hub controller 32 power-supplied by power supply 36 wherein assembly housing 40 and USB hub controller 32 are electrically connected to power supply 36 through the same power cable 35 so that assembly housing 40 provides thereby a USB hub.

Specifically, computer case 37 further includes a mother board 371 having a USB port 3710, in which USB hub (341) further includes an upstream connector or Series B receptacle 31, a USB cable 38 electrically connecting together upstream Series B receptacle 31 and USB port 3710, a plurality of downstream USB connectors or Series A receptacles 33, and a USB hub controller 32 electrically connected between upstream Series B receptacle 31 and downstream Series A receptacles 33.

Although FIG. 3 shows that disk assembly 34 is an optically accessible device or optical storage device, it is imaginable that a floppy disk drive can also apply the principle of the present invention if fewer, e.g. 1, Series A connector 33 is desired. Disk assembly 34 can be a CD-ROM drive, a DVD-ROM drive, a CD-RW drive, or an assembly built with a DVD-ROM drive and a CD-RW drive.

Described differently, a disk assembly 34 according to the present invention includes an assembly housing 40 having a front end 48 for inserting/retrieving therethrough a disk 49 storing thereon computer-accessible data, a front panel 480 mounted at front end 48 and having a tray slot 41 for passing therethrough disk 49, a light emitting diode 42, an earphone socket 43, a volume knob 44 and two control buttons 45, 46, and 4 USB connectors 47 mounted on the free space of front panel 480 and adapted to electrically connect therethrough a peripheral device to a computer case.

Describing differently further, a USB hub according to the present invention adapted to be used with computer case 37 having a mother board 371 having a USB port 3710 includes an assembly housing 40 for inserting therein/retrieving therefrom a disk 49 storing thereon computer-accessible data, an upstream connector 31, a USB cable 38 electrically connecting together upstream connector 31 and USB port 3710, a plurality of downstream connectors 33 for respectively electrically connecting therethrough a plurality of peripheral devices to computer case 37, and a USB hub controller 32 electrically connected between upstream USB connector 31 and downstream USB connectors 33. Assembly housing 40 further includes a front end 48 for inserting/retrieving therethrough disk 49, and a front panel 480 mounted at front end 48 and having a tray slot 41 for passing therethrough disk 49. Computer case 37 has a power supply 36 and assembly housing 40 and USB hub controller 32 are electrically connected to power supply 36 through the same power cable 35.

While the invention has been described in terms of what are presently conedgered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

I claim:

1. A computer case mounting therein a disk assembly, said disk assembly comprising:

an assembly housing having a front end for inserting/retrieving therethrough a disk storing thereon computer-accessible data;

a front panel mounted at said front end and having a slot for passing therethrough said disk; and a USB connector mounted on said front panel for electrically connecting therethrough a peripheral device to said computer case, wherein said computer case further includes a mother board having a USB port; and a USB hub further including:
  an upstream connector;
  a USB cable electrically connecting together said upstream connector and said USB port;
  another USB connector; and
  a USB hub controller electrically connected between said upstream connector and said USB connectors.

2. A computer case according to claim 1 wherein:

said computer case includes a power supply for power-supplying said computer case; and said assembly housing includes therein a USB hub controller power-supplied by said power supply.

3. A computer case according to claim 2 wherein said assembly housing and said USB hub controller are electrically connected to said power supply through the same power cable.

4. A computer case according to claim 1 wherein said assembly housing provides thereby said USB hub.

5. A computer case according to claim 4 wherein said upstream connector is a Series B receptacle.

6. A computer case according to claim 4 wherein said USB connectors are Series A receptacles.

7. A computer case according to claim 1 wherein said disk assembly is a floppy disk drive.

8. A computer case according to claim 1 wherein said disk assembly is an optically accessible assembly.

9. A computer case according to claim 8 wherein said disk assembly is a CD-ROM drive.

10. A computer case according to claim 8 wherein said disk assembly is a DVD-ROM drive.

11. A computer case according to claim 8 wherein said disk assembly is a CD-RW drive.

12. A computer case according to claim 8 wherein said disk assembly is built with a DVD-ROM drive and a CD-RW drive.

13. A disk assembly comprising:

an assembly housing having a front end for inserting/retrieving therethrough a disk storing thereon computer-accessible data;

a front panel mounted at said front end and having a slot for passing therethrough said disk; and a USB connector mounted on said front panel and adapted to electrically connect therethrough a peripheral device to a computer case, wherein said computer case further includes a mother board having a USB port; and a USB hub further including:
  an upstream connector;
  a USB cable electrically connecting together said upstream connector and said USB port;
  another USB connector; and
  a USB hub controller electrically connected between said upstream connector and said USB connectors.

14. A disk assembly according to claim 13 wherein said disk assembly is a floppy disk drive.

15. A disk assembly according to claim 13 wherein said disk assembly is an optically accessible assembly.

16. A disk assembly according to claim 13 wherein said assembly housing provides thereby said USB hub.

\* \* \* \* \*